United States Patent
Byrne et al.

(10) Patent No.: US 12,233,819 B2
(45) Date of Patent: Feb. 25, 2025

(54) VEHICLE ROOF RACK ASSEMBLY

(71) Applicants: NISSAN NORTH AMERICA, INC., Franklin, TN (US); JAC PRODUCTS, INC., Saline, MI (US); NISSAN MOTOR CO., LTD., Yokohama (JP)

(72) Inventors: Gregory Byrne, Novi, MI (US); Christian Herrington, Walled Lake, MI (US); Nicholas Trifonoff, Commerce Township, MI (US); Michael Borovica, Saline, MI (US); Anilkumar Bandi, Saline, MI (US); Shigeyuki Yoshida, Atsugi (JP)

(73) Assignees: Nissan North America, Inc., Franklin, TN (US); JAC PRODUCTS, INC., Saline, MI (US); Nissan Motor Co., Ltd., Yokohama (JP)

( * ) Notice: Subject to any disclaimer, the term of this patent is extended or adjusted under 35 U.S.C. 154(b) by 179 days.

(21) Appl. No.: 18/176,320

(22) Filed: Feb. 28, 2023

(65) Prior Publication Data
US 2024/0286555 A1     Aug. 29, 2024

(51) Int. Cl.
*B60R 9/04*     (2006.01)
(52) U.S. Cl.
CPC ...................... *B60R 9/04* (2013.01)
(58) Field of Classification Search
CPC ........................................................ B60R 9/04
USPC ................................ 224/309, 317, 325, 326
See application file for complete search history.

(56) References Cited

U.S. PATENT DOCUMENTS

| | | | |
|---|---|---|---|
| 6,425,508 B1 | 7/2002 | Cole et al. | |
| D508,015 S * | 8/2005 | Badillo | D12/412 |
| 7,044,346 B2 * | 5/2006 | Bruner | B60R 9/00 224/327 |
| D578,952 S * | 10/2008 | Badillo | D12/406 |
| 9,162,628 B2 * | 10/2015 | Schellens | B60Q 1/2611 |
| D841,565 S * | 2/2019 | Badillo | D12/412 |
| D996,341 S * | 8/2023 | Wakabayashi | D12/406 |
| 2005/0082326 A1 * | 4/2005 | Badillo | B62D 43/02 224/326 |
| 2008/0047993 A1 * | 2/2008 | Wooten | B60R 9/00 224/325 |

FOREIGN PATENT DOCUMENTS

| | | | |
|---|---|---|---|
| BR | PI0902271 A2 | 3/2011 | |
| CN | 202753878 U | 2/2013 | |
| EP | 3647121 A1 | 5/2020 | |
| FR | 2666285 A1 * | 3/1992 | |
| WO | 2011/037499 A1 | 3/2011 | |

* cited by examiner

*Primary Examiner* — Justin M Larson
(74) *Attorney, Agent, or Firm* — Global IP Counselors, LLP (57) ABSTRACT

A vehicle roof has an antenna and a roof rack assembly installed thereon. The roof rack assembly has a first pipe and a second pipe at opposite sides of the vehicle roof. The first and second pipe have respective rearward portions that extend rearward of the antenna but are shaped, positioned and dimensioned to extend along and outside of an interference perimeter of the antenna thereby eliminating or minimizing possible interference with the reception capabilities of the antenna.

11 Claims, 11 Drawing Sheets

VEHICLE ROOF RACK ASSEMBLY

BACKGROUND

Technical Field

The present disclosure generally relates to a vehicle roof rack assembly installed to a vehicle roof. More specifically, the present disclosure relates to vehicle roof rack assembly that is dimensioned and shaped to extend adjacent to but not within an interference space defined by an antenna installed to the vehicle roof.

Background Information

Many vehicles are now provided with a satellite antenna that is configured to receive signals from a satellite orbiting the earth that include radio signals for a satellite radio within the vehicle. A problem with satellite antennas is the antenna operates optimally when there is a "line-of-sight" to the satellite providing the signals. Depending upon the location of the vehicle on the surface of the earth, the satellite might not be directly above the vehicle, but rather may be somewhere closer to the horizon. Some antennas further require a minimal distance between the antenna and any other structures on the roof of the vehicle, such as another antenna or a roof rack, in order to operate optimally.

SUMMARY

One object of the present disclosure is to provide a vehicle having a satellite antenna with a roof rack assembly that does not interfere with the reception capabilities of the satellite antenna and provides a maximum amount of rack cargo receiving space for retaining cargo.

In view of the state of the known technology, one aspect of the present disclosure is to provide a vehicle roof rack assembly with a vehicle roof having an antenna installed thereon. The antenna defines an interference perimeter around itself that is a predetermined distance from the antenna, the interference perimeter surrounds an interference space around the antenna such that the antenna operates optimally in the absence of structures within the interference space. A first pipe is installed to the vehicle roof. The first pipe has a main portion and a rearward portion. The main portion thereof extends along a first lateral side of the vehicle roof. The rearward portion has a first section, a second section and a third section. The first section extends rearward from the main portion and rearward of the antenna. The second section extends in an inboard direction rearward of the antenna, a third section extends in a forward direction from the second portion inboard of the first section and outboard of the antenna along and outside of the interference perimeter such that the third section is spaced apart from the antenna by at least the predetermined distance. A second pipe is installed to the vehicle roof. The second pipe includes a main portion and a rearward portion. The main portion thereof extends along a second lateral side of the vehicle roof opposite the first lateral side. The rearward portion has a first section, a second section and a third section. The first section extends rearward from the main portion and rearward of the antenna. The second section extends in an inboard direction rearward of the antenna. The third section extends in a forward direction from the second portion inboard of the first section and outboard of the antenna along and outside of the interference perimeter such that the third section is spaced apart from the antenna by at least the predetermined distance.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
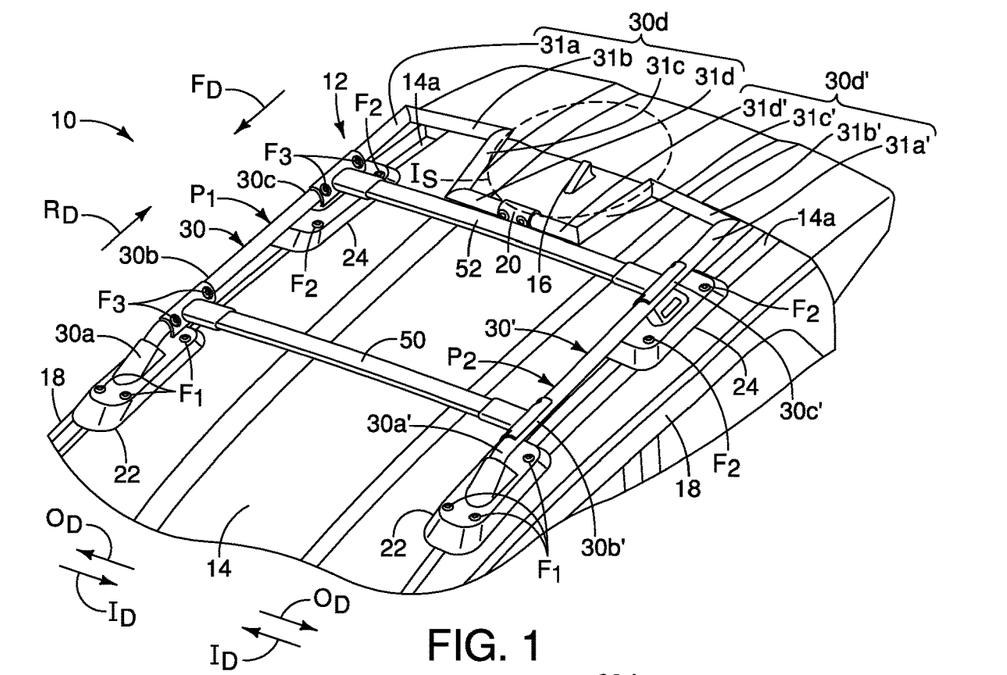
FIG. 1 is a perspective view of a vehicle roof with an antenna and a roof rack assembly installed thereto in accordance with a first embodiment.

Referring initially to FIG. 1, a vehicle 10 having a roof rack assembly 12 is illustrated in accordance with a first embodiment.

The vehicle 10 has a roof structure 14 with the roof rack assembly 12 being attached or installed to the roof structure 14. An antenna 16 is attached to a rearward area of the roof structure 14 and is centered relative to lateral sides 18 of the roof structure 14.

Figure 2:
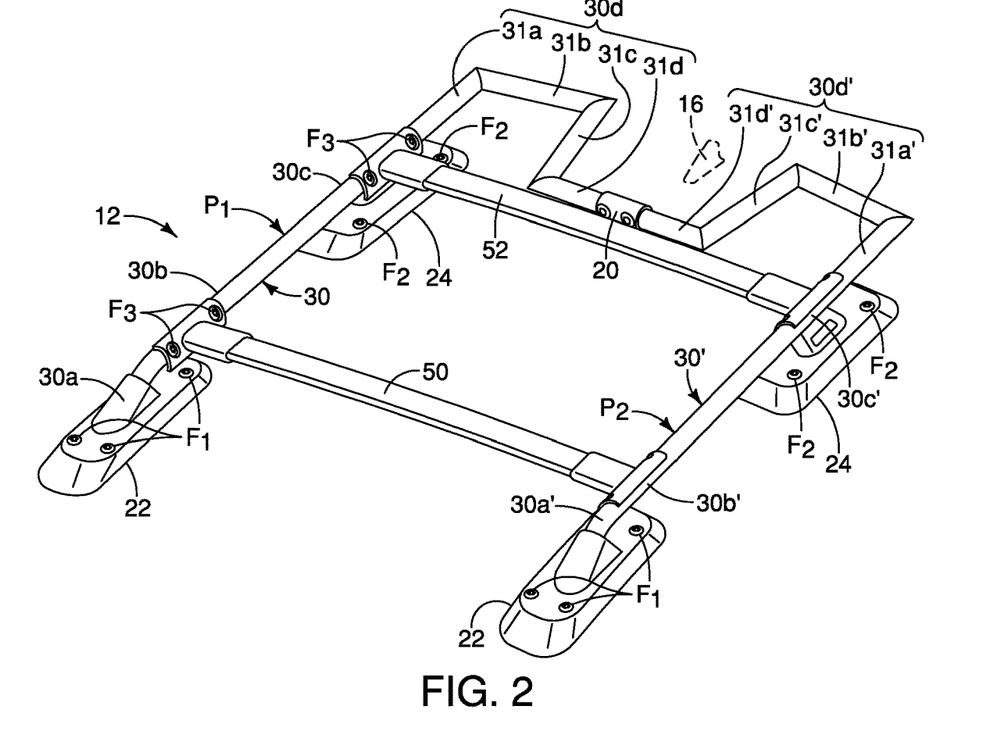
FIG. 2 is a perspective view of the roof rack assembly removed from the vehicle roof showing a first pipe and a second pipe in accordance with the first embodiment.
Figure 3:
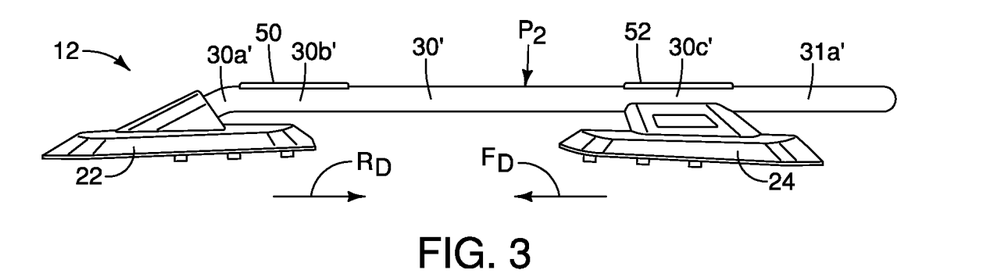
FIG. 3 is a side view of the roof rack assembly depicted in FIG. 2 showing the second pipe, one of two forward attachment assemblies and one of two rear attachment assemblies in accordance with the first embodiment.
Figure 4:
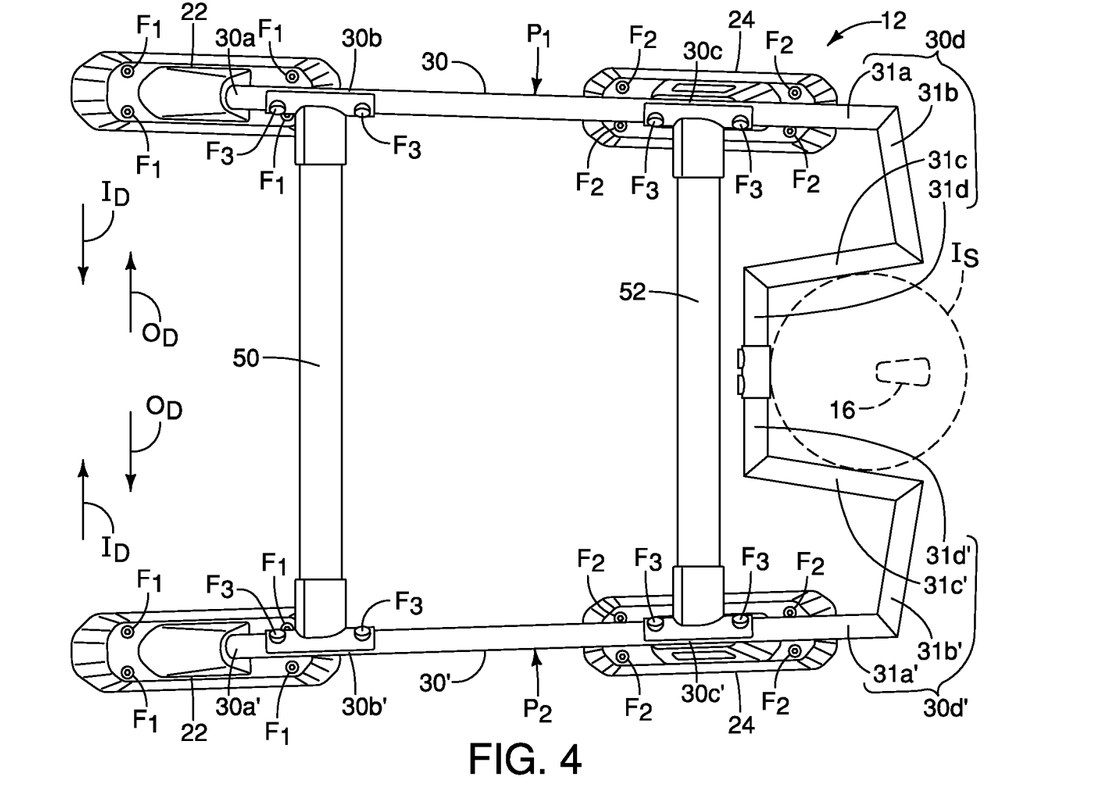
FIG. 4 is a top view of the roof rack assembly depicted in FIGS. 2 and 3 showing the first and second pipes, the two forward attachment assemblies the two rear attachment assemblies, a front cross member and a rear cross member in accordance with the first embodiment.
Figure 5:
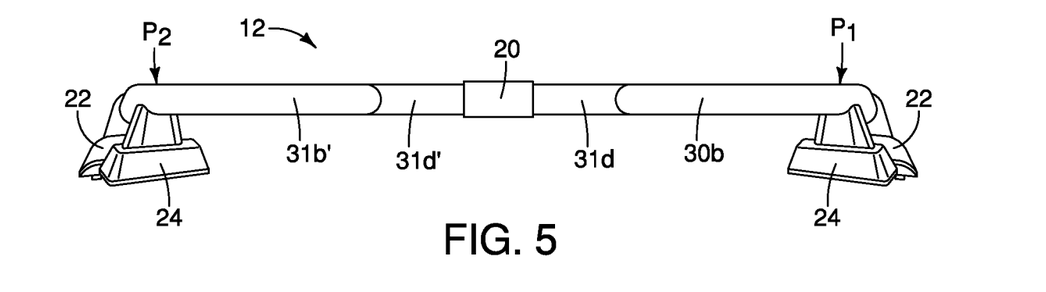
FIG. 5 is a rear view of the roof rack assembly depicted in FIGS. 2-4 showing the first and second pipes, a connector attaching the first pipe to the second pipe, the two forward attachment assemblies and the two rear attachment assemblies in accordance with the first embodiment.

The roof rack assembly 12 basically includes a first tube or first pipe $P_1$, a second tube or second pipe $P_2$, a tube connector 20, forward attachment assemblies 22 and rear attachment assemblies 24.

The first pipe $P_1$ has a main section 30 with a front end 30a, a forward portion 30b and a mid-portion 30c. The first pipe $P_1$ further includes a rearward portion 30d that extends rearward from the mid-portion 30c. The rearward portion 30d includes a first section 31a, a second section 31b, a third section 31c and a fourth section 31d. The first section 31a is directly attached to or extends from the mid-portion 30c.

The second section 31b is fixedly attached to the first section 31a by, for example, welding, adhesive, or other attachment techniques. The second section 31b extends in an inboard direction from the first section 31a and is attached to a rearward end of the third section 31c. A forward end of the third section 31c is fixedly attached to the fourth section 31d. The fourth section 31d extends laterally inboard from the forward end of the third section 31c to approximately a center of the roof structure 14.

The first pipe $P_1$ can be made of a variety of materials. For example, the first pipe $P_1$ can be made of a metallic material such as steel, aluminum or aluminum alloy, in which case the main section 30 and the rearward portion 30d can be welded to one another to form the depicted shape. Alternatively, if made of metal such as steel, aluminum or aluminum alloy, the first pipe $P_1$ can be bent into the depicted shape.

Preferably, the first pipe $P_1$ can also be made of, for example, a fiberglass/resin material or other composite materials, plastic, polymer materials, or nylon and polymer materials such as, for example, Nylon 6 or polycaprolactam.

The second pipe $P_2$ has a main section 30' with a front end 30a', a forward portion 30b' and a mid-portion 30c'. The second pipe $P_2$ further includes a rearward portion 30d' that extends rearward from the mid-portion 30c. The rearward portion 30d' includes a first section 31a', a second section 31b', a third section 31c' and a fourth section 31d'. The first section 31a' is directly attached to or extends from the mid-portion 30c'.

The second section 31b' is fixedly attached to the first section 31a' by, for example, welding, adhesive, or other attachment techniques. The second section 31b' extends in an inboard direction from the first section 31a' and is attached to a rearward end of the third section 31c'. A forward end of the third section 31c' is fixedly attached to the fourth section 31d'. The fourth section 31d' extends laterally inboard from the forward end of the third section 31c' to approximately a center of the roof structure 14.

As with the first pipe $P_1$, the second pipe $P_2$ can be made of a variety of materials. For example, the second pipe $P_2$ can be made of a metallic material such as steel, aluminum or aluminum alloy, in which case the main section 30' and the rearward portion 30d' can be welded to one another to form the depicted shape. Alternatively, if made of metal such as steel, aluminum or aluminum alloy, the second pipe $P_2$ can be bent into the depicted shape.

Preferably, the second pipe $P_2$ can also be made of, for example, a fiberglass/resin material or other composite materials, plastic, polymer materials, or nylon and polymer materials such as, for example, Nylon 6 or polycaprolactam.

The first pipe $P_1$ and the second pipe $P_2$ are basically identical to one another, except that they are symmetrical to one another, being mirror images of one another.

The inboard ends of the fourth section 31d of the first pipe $P_1$ and the fourth section 31d' of the second pipe $P_2$ can be connected to one another by the tube connector 20 in a manner described further below.

The third section 31c and the fourth section 31d of the first pipe $P_1$ and the third section 31c' and the fourth section 31d' of the second pipe $P_2$ are shaped and positioned to be a predetermined distance away from the antenna 16. Put another way, those portions of the first pipe $P_1$ and the second pipe $P_2$ closest to the antenna 16 are spaced apart from the antenna 16 by a predetermined distance.

The antenna 16 can be any of a variety of antenna configurations made by various companies. In modern vehicles provided with satellite radio, the antenna 16 typically has requirements and restrictions on structures surrounding the antenna 16. Specifically, structures that are too close to the antenna 16 can interfere with the antenna's ability to effectively receive certain signals broadcast by, for example, satellites orbiting the earth broadcast signals to vehicles on the surface of the earth. Structures adjacent to an antenna for satellite radio can interfere with the antenna's ability to receive satellite signals. Therefore, the antenna 16 defines an interference perimeter $I_S$ around itself that is a predetermined distance from the antenna 16. The interference perimeter $I_S$ surrounds or encircles an interference space around the antenna 16. The antenna 16 operates optimally in the absence of structures (such as other antennas or roof racks) being located within the interference space defined within the interference perimeter $I_S$.

The overall shape and dimensions of the first pipe $P_1$ and the second pipe $P_2$ are designed to limit and/or eliminate the possibility of interfering with the reception capabilities of the antenna 16 by being spaced apart from the antenna 16 such that the roof rack assembly 12 is located outside or adjacent to the interference perimeter $I_S$.

Specifically, the third section 31c and the fourth section 31d of the first pipe $P_1$ and the third section 31c' and the fourth section 31d' of the second pipe $P_2$ are shaped to extend around the antenna 16 outside or adjacent to the interference perimeter $I_S$ in order to minimize or eliminate any possible impact on the optimal performance of the antenna 16. In other words, objects and structures such as the roof rack assembly 12 must be a predetermined distance (the interference perimeter $I_S$) away from the antenna 16 in order for the antenna 16 to operate with optimal efficiency.

As shown in FIGS. 1-6, there are two forward attachment assemblies 22. One of the forward attachment assemblies 22 is located at the front end 30a of the main section 30 of the first pipe $P_1$ and the other of the forward attachment assemblies 22 is located at the front end 30a' of the main section 30' of the second pipe $P_2$. Further, the one of the forward attachment assemblies 22 connects the front end 30a of the main section 30 of the first pipe $P_1$ to a first lateral side of the roof structure 14. The other of the forward attachment assemblies 22 connects the front end 30a' of the main section 30' of the second pipe $P_2$ to a second lateral side of the roof structure 14.

Since the two forward attachment assemblies 22 are basically identical (but mirror images of one another) only one of the forward attachment assemblies 22 is described herein below. However, the description below of one of the forward attachment assemblies 22 applies equally to both of the forward attachment assemblies 22.

Figure 6:
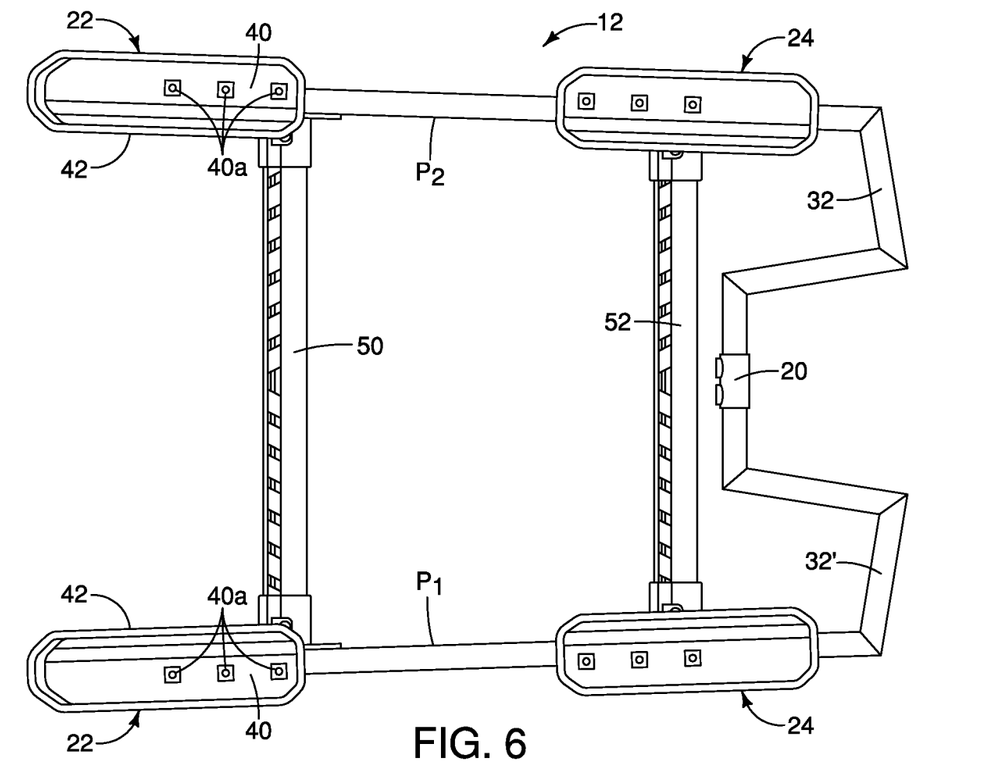
FIG. 6 is a bottom view of the roof rack assembly depicted in FIGS. 2-5 showing the first and second pipes, the two forward attachment assemblies the two rear attachment assemblies, a front cross member and a rear cross member in accordance with the first embodiment.
Figure 7:
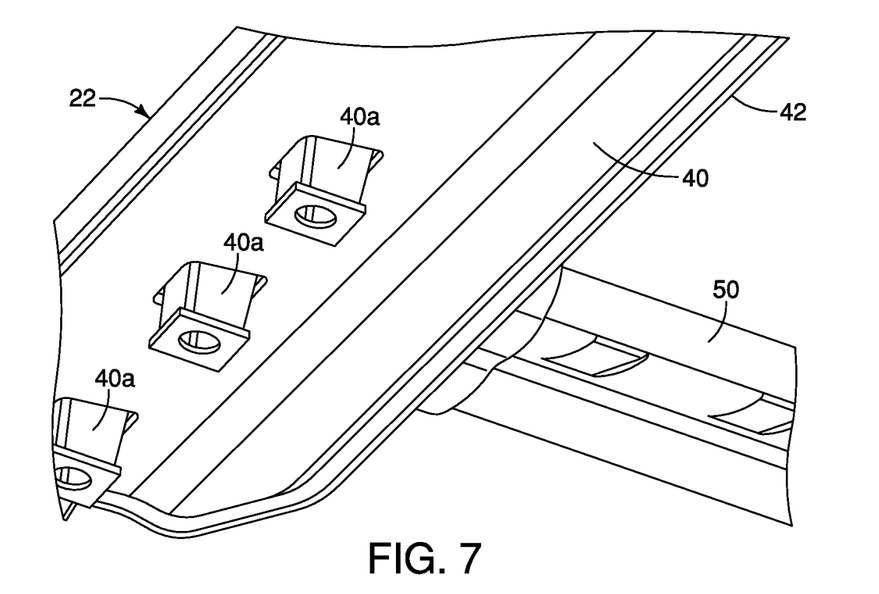
FIG. 7 is a perspective view of a lower surface of one of the forward attachment assemblies in accordance with the first embodiment.
Figure 8:
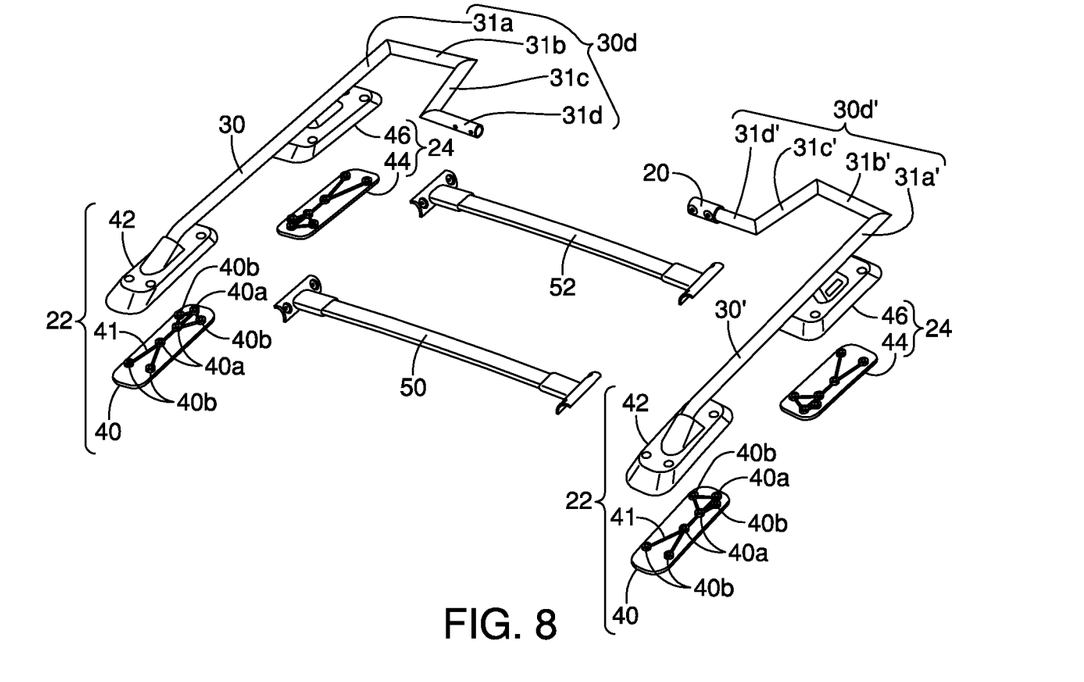
FIG. 8 is an exploded perspective view of the roof rack assembly depicted in FIGS. 2-7 showing the first and second pipes, the connector, the two forward attachment assemblies the two rear attachment assemblies, a front cross member and a rear cross member in accordance with the first embodiment.
Figure 9:
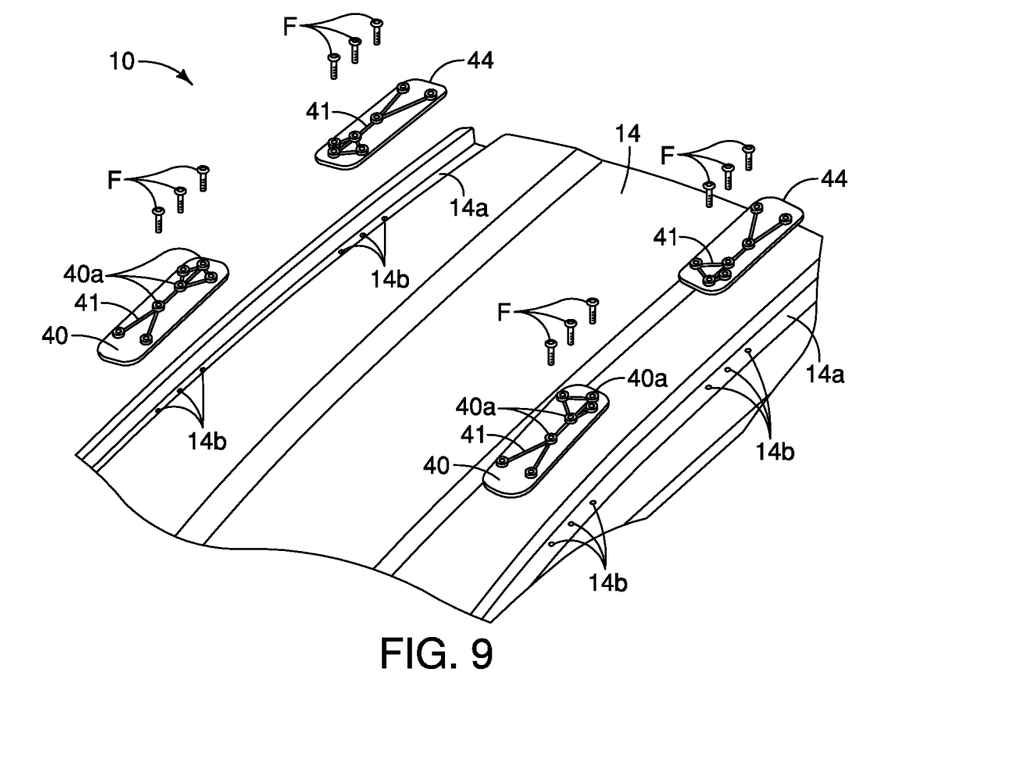
FIG. 9 is an exploded perspective view of portions of the roof rack assembly being installed to the vehicle roof in accordance with the first embodiment.
Figure 10:
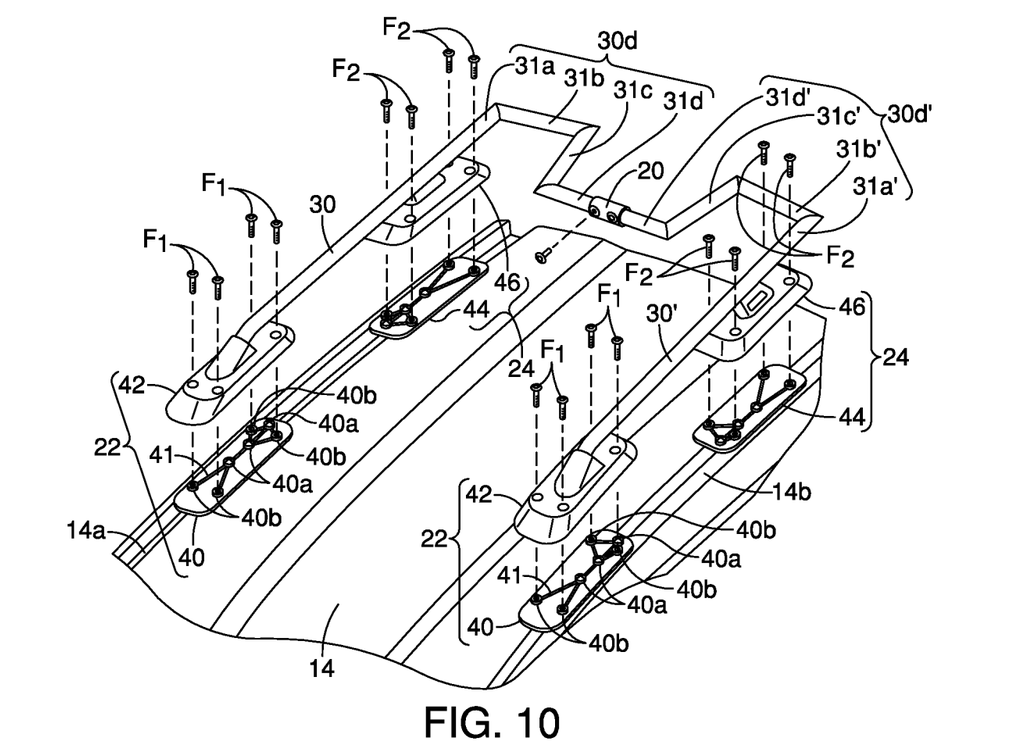
FIG. 10 is an exploded perspective view of additional portions of the roof rack assembly being installed to the vehicle roof in accordance with the first embodiment.

As shown in FIG. 6-10, the forward attachment assembly 22 includes a base plate 40, a base 42 and fasteners F and $F_1$. As shown in FIGS. 8, 9 and 10, the base plate 40 includes a metallic web 41 that has three downwardly extending hollow projections 40a that are also shown in FIGS. 6 and 7. The metallic web 41 of the base plate 40 also includes threaded members 40b. The hollow projection 40a are dimensioned to extend into a roof ditch 14a of the roof structure 14. As shown in FIG. 9, fasteners F are inserted into the hollow projections 40a, extending therethrough and threaded into openings 14b within the roof ditch 14a thereby attaching the base plate 40 to the roof structure 14. The base plate 40 itself can be made of any of a variety of materials, such as rubber, a synthetic rubber material, plastic, flexible polymers, etc., with the metallic web 41 overlaying the base plate 40. Alternatively, the web 41 can be made of a non-metallic material and formed with or molded onto or with the base plate 40 to make a single, unitary, monolithic element.

Figure 12:
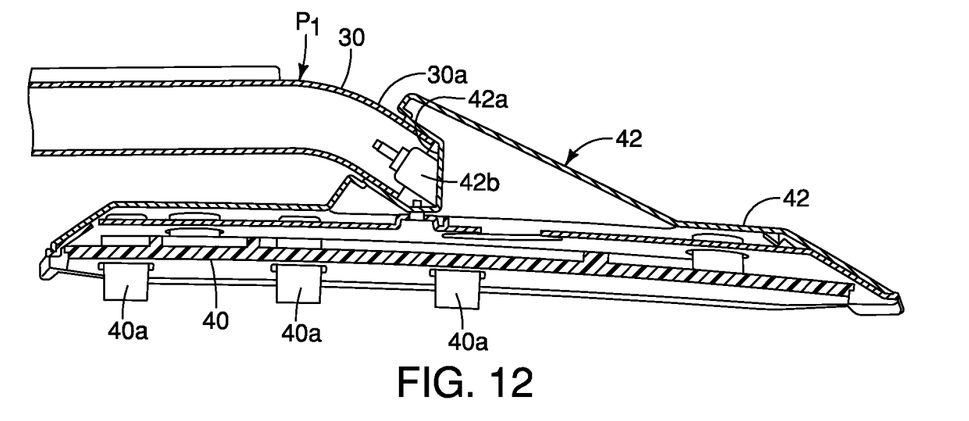
FIG. 12 is a cross sectional view of a front portion of the first pipe and corresponding one of the forward attachment assemblies in accordance with the first embodiment.

As shown in FIG. 12, the base 42 includes a hollow interior 42a that is dimensioned to receive and retain the front end 30a of the first pipe $P_1$. The hollow interior 42a can include an alignment/retaining structure 42b that assists in aligning and then retaining the front end 30a of the first pipe $P_1$ within the hollow interior 42a.

The base 42 overlays the base plate 40 when installed to the roof structure 14. The base 42 is dimensioned to overlay and compress the base plate 40 as fasteners $F_1$ are installed through openings in the base 42 and tightened to the base plate 40. The fasteners $F_1$ extend into the openings in the base 42 and further into the threaded members 40b of the metallic web 41 of the base plate 40.

The rear attachment assemblies 24 are similar to the forward attachment assembly 22. Specifically, as shown in FIGS. 7-10, the rear attachment assemblies 24 include a base plate 44, a base 46 and fasteners F and $F_2$. As shown in FIGS. 8, 9 and 10, the base plate 44 includes the metallic web 41 with the hollow projections 40a and threaded members 40b as described above with reference to the forward attachment assemblies 22.

As with the forward attachment assemblies 22, the hollow projection 40a of the rear attachment assemblies 24 are dimensioned to extend into the roof ditch 14a of the roof structure 14. As shown in FIG. 9, the fasteners F are inserted into the hollow projections 40a, extending therethrough and threaded into openings 14b within the roof ditch 14a thereby attaching the base plate 44 to the roof structure 14. The base plate 44 itself can be made of any of a variety of materials, such as rubber, a synthetic rubber material, plastic, flexible polymers, etc., with the metallic web 41 overlaying the base plate 44. Alternatively, the web 41 can be made of a non-metallic material and formed with or molded onto or with the base plate 44 to make a single, unitary, monolithic element.

Figure 13:
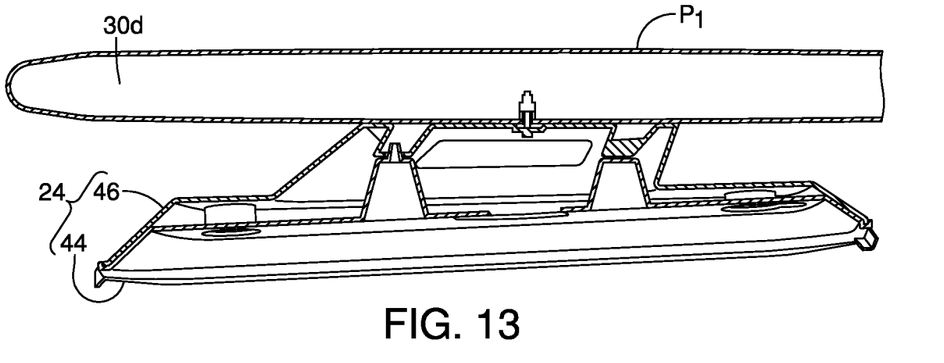
FIG. 13 is a cross sectional view of a rearward portion of the first pipe and corresponding one of the rear attachment assemblies in accordance with the first embodiment.
Figure 14:
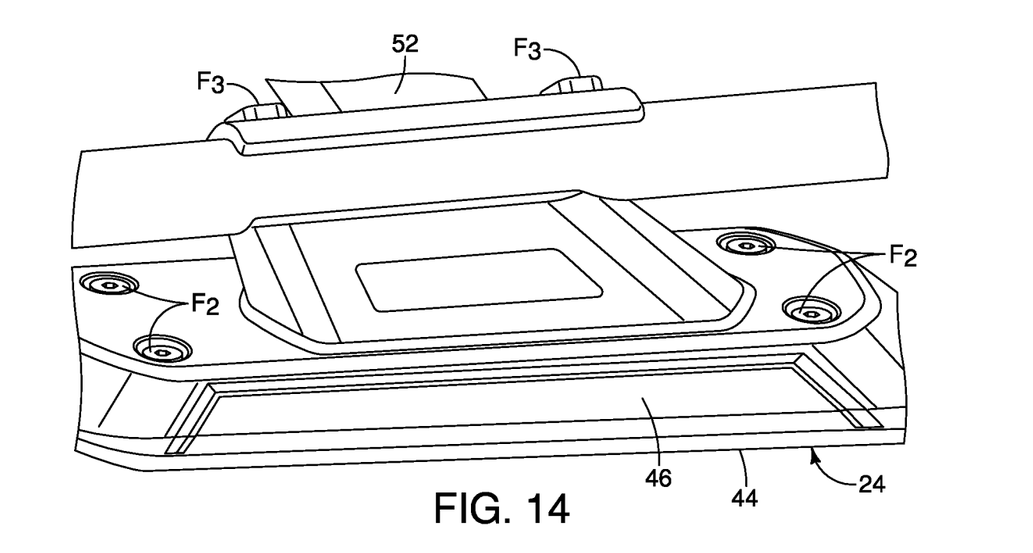
FIG. 14 is a perspective view of the rearward portion of the first pipe and the corresponding one of the rear attachment assemblies with the rear optional cross member attached to the first pipe in accordance with the first embodiment.

As shown in FIG. 13, the base 46 attaches to a rearward portion 30c of the first pipe $P_1$. When installed, the base 46 overlays the base plate 44 when installed to the roof structure 14. The base 46 is dimensioned to overlay and compress the base plate 44 as fasteners $F_2$ are installed through openings in the base 46 and tightened to the base plate 44. As shown in FIG. 10, the fasteners $F_2$ extend into the openings in the base 42 and further into the threaded members 40b of the metallic web 41 of the base plate 40.

Figure 11:
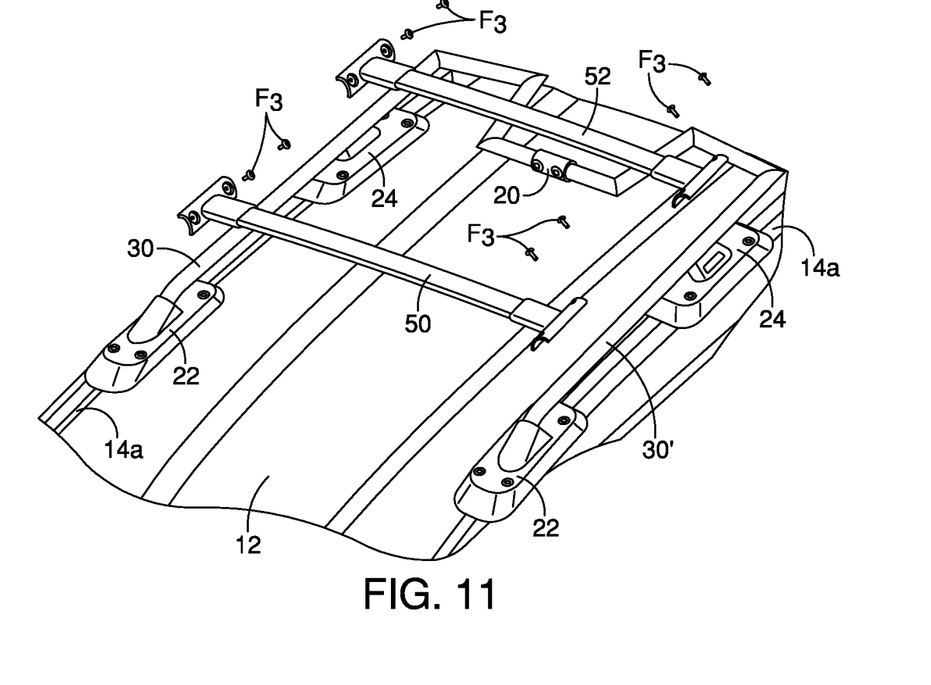
FIG. 11 is an exploded view of the roof rack assembly installed to the vehicle roof with the optional cross members being installed to the roof rack assembly in accordance with the first embodiment.

As shown in FIGS. 8 and 11, once the first pipe $P_1$ and the second pipe $P_2$ are installed to the roof structure 14 via the attachment of the forward attachment assembly 22 and the rear attachment assemblies 24, optional cross members 50 and 52 can be installed to the first pipe $P_1$ and the second pipe $P_2$. Specifically, one end of the cross member 50 is fastened via fasteners $F_3$ to the forward portion 30b of the first pipe $P_1$ and the other end of the cross member 50 is fastened via fasteners $F_3$ to the forward portion 30b' of the second pipe $P_2$.

A description of the tube connector 20 is now provided with reference to FIGS. 15-22. During the assembly and installation of the roof rack assembly 12 to the roof structure 14 of the vehicle 10, the first pipe $P_1$ and the second pipe $P_2$ are attached to one another via the tube connector 20. As described below, the tube connector 20 provides a coupling member that allows for slight mis-alignment of the first pipe $P_1$ relative to the second pipe $P_2$.

Figure 15:
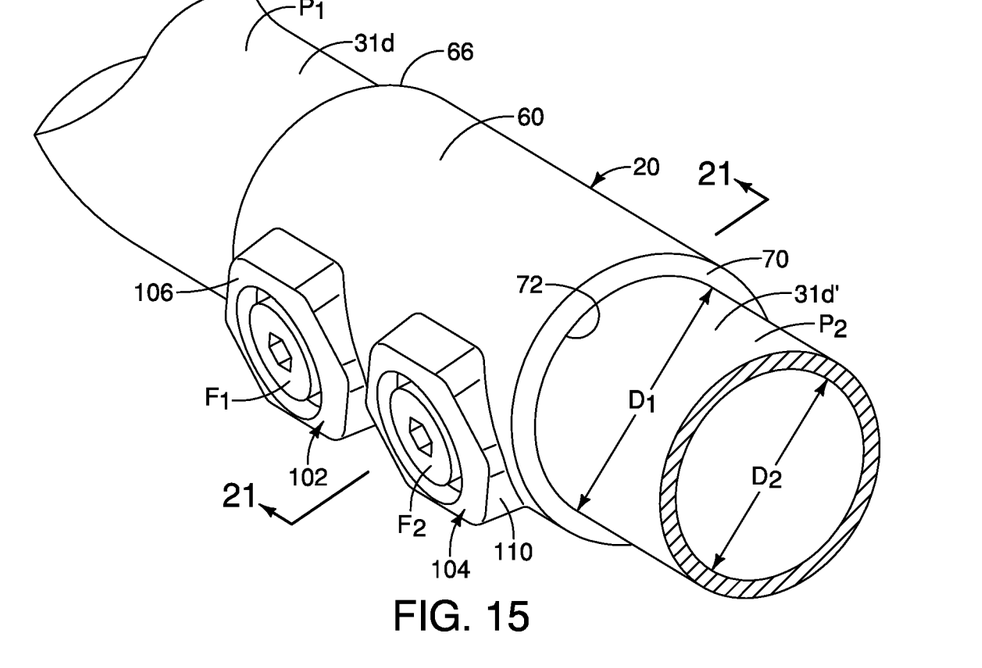
FIG. 15 is a perspective view showing a tube connector with a first pipe inserted into a first end and a second pipe inserted into a second end in accordance with the first embodiment.

Referring initially to FIG. 15, the tube connector 20 is dimensioned and configured to connect the first pipe $P_1$ to the second pipe $P_2$.

Figure 16:
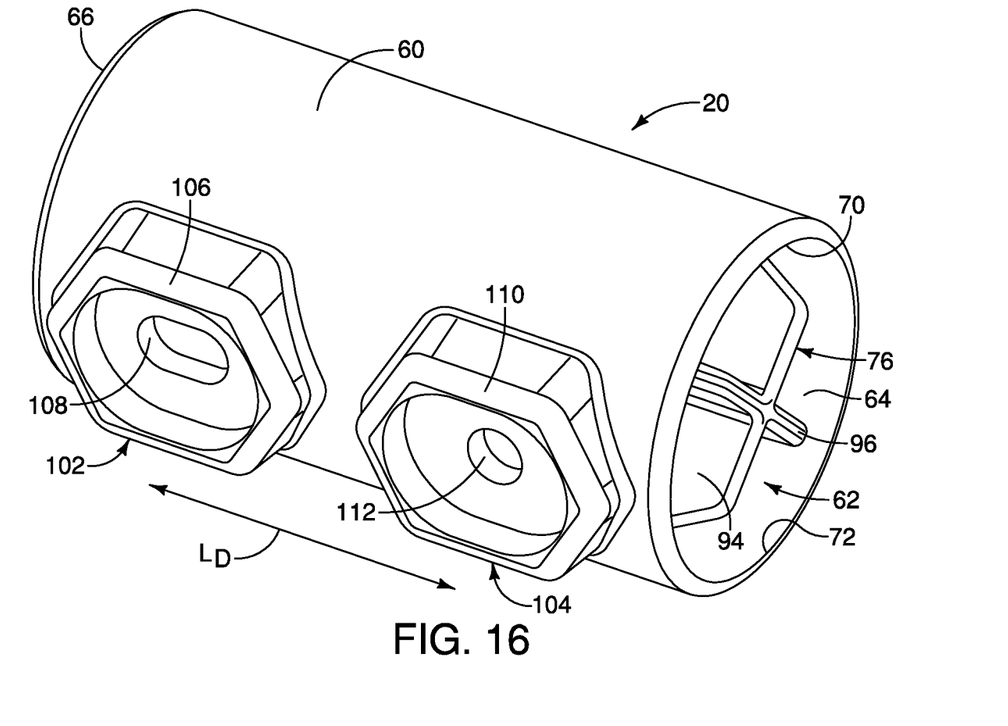
FIG. 16 is another perspective view showing the tube connector with the first and second pipe removed showing one of two pipe aligning structures within the tube connector in accordance with the first embodiment.
Figure 17:
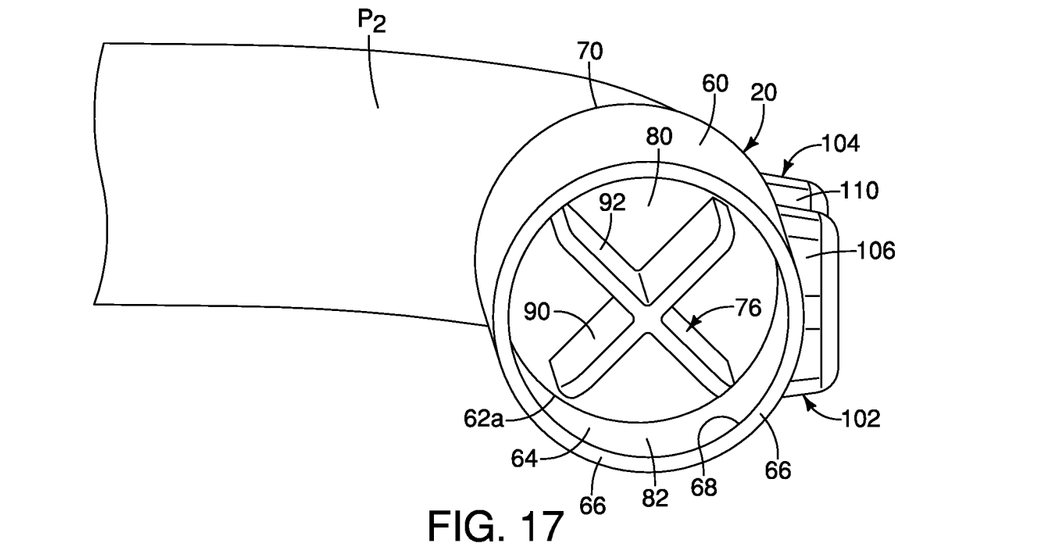
FIG. 17 is an end perspective view of the tube connector with one pipe inserted into the second end of the tube connector showing another of the pipe aligning structures visible through the first end of the tube connector in accordance with the first embodiment.

As shown in FIG. 16 with the first pipe $P_1$ and the second pipe $P_2$ removed, the connector 20 basically includes a cylindrically shaped body 60 that has a hollow interior 62. The hollow interior 62 defines a cylindrical inner surface 64.

The cylindrically shaped body 60 has a first end 66 with a first opening 68 and a second end 70 with a second opening 72. The first opening 68 and the second opening 72 are both open to the hollow interior 62, but at opposite ends thereof. The cylindrically shaped body 60 includes a pipe aligning structure 76. The pipe aligning structure 76 is located within the hollow interior 62 and is spaced apart from the cylindrical inner surface 64 of the cylindrically shaped body 60. The pipe aligning structure 76 is dimensioned and shaped to receive, guide and center the first pipe $P_1$ (a hollow pipe) into the first end 66. The pipe aligning structure 76 is also dimensioned and shaped to receive, guide and center the second pipe $P_2$ (another hollow pipe) into the second end 70 of the cylindrically shaped body 60.

Figure 19:
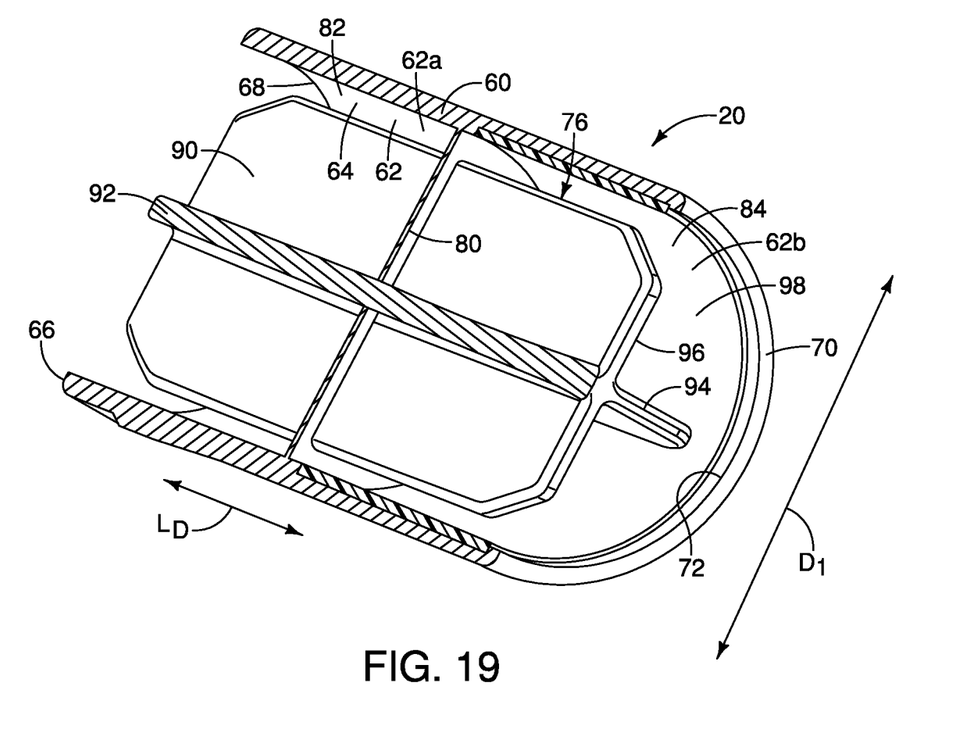
FIG. 19 is a cross-sectional view of the tube connector taken along the line 19-19 in FIG. 18 showing a wall that divides the hollow interior of the tube connector into first and second hollow spaces with a first of the pipe aligning structures in the first hollow space and the second of the pipe aligning structures in the second hollow space in accordance with the first embodiment.
Figure 22:
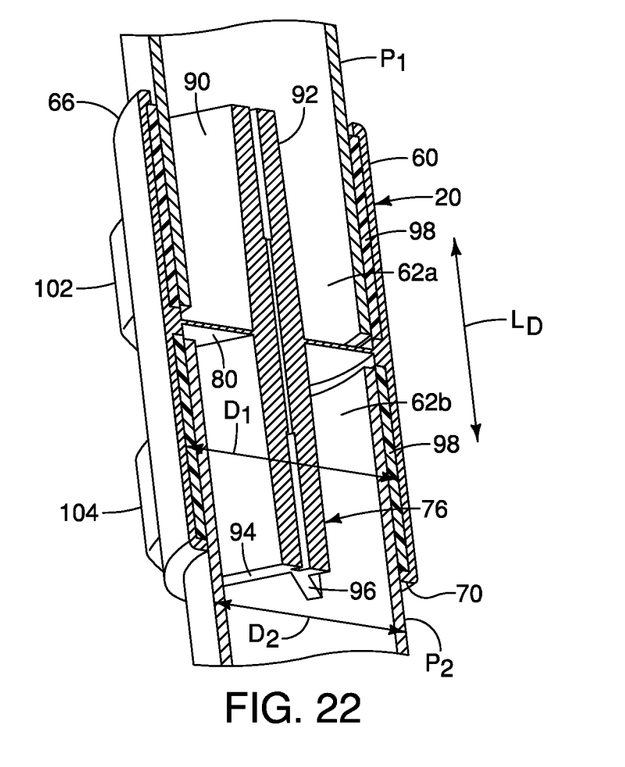
FIG. 22 is another cross-sectional view similar to FIG. 19 showing a first pipe inserted into the first end of the tube connector, a second pipe inserted into the second end of the tube connector and further showing the wall and the pipe aligning structure within the hollow interior of the tube connector in accordance with the first embodiment.

As shown in FIGS. 19 and 22, the hollow interior 62 of the cylindrically shaped body 60 includes a wall 80 that divides the hollow interior 62 into a first portion 82 and a second portion 84, generally equal in size. In the depicted embodiment, the wall 80 separates the first portion 82 from the second portion 84 of the hollow interior 62. In the depicted embodiment, the wall 80 is perpendicular to a lengthwise direction $L_D$ of the cylindrically shaped body 60 and can be centered between the first end 66 and the second end 70. It should be understood from the drawings and the description herein that the wall 80 is not required to be centered between the first end 66 and the second end 70 but can alternatively be off-center between the first end 66 and the second end 70, depending upon the desired usage and requirements of the tube connector 20.

The wall 80 further divides the hollow interior 62 into a first hollow space 62a accessed by the first opening 68 and a second hollow space 62b accessed by the second opening 72. as shown in FIGS. 19 and 22. As shown in FIGS. 16-20 and 22, within the first hollow space 62a, the pipe aligning structure 76 includes a first elongated projection 90 and a second elongated projection 92 that extends outward from the wall 80.

Figure 20:
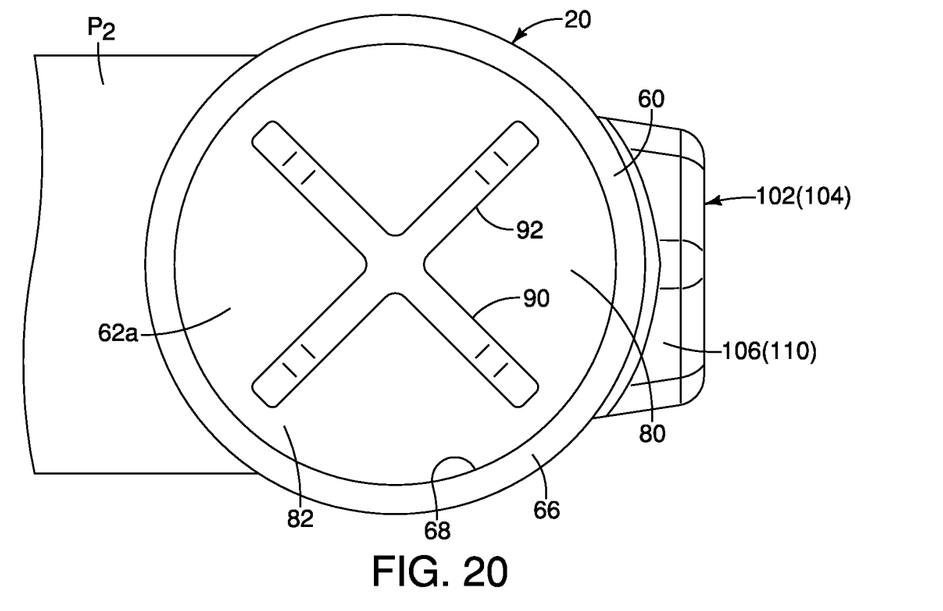
FIG. 20 is an end view of the first opening in the first end of the tube connector showing the first pipe aligning structure having an overall X-shape in accordance with an exemplary embodiment.
Figure 21:
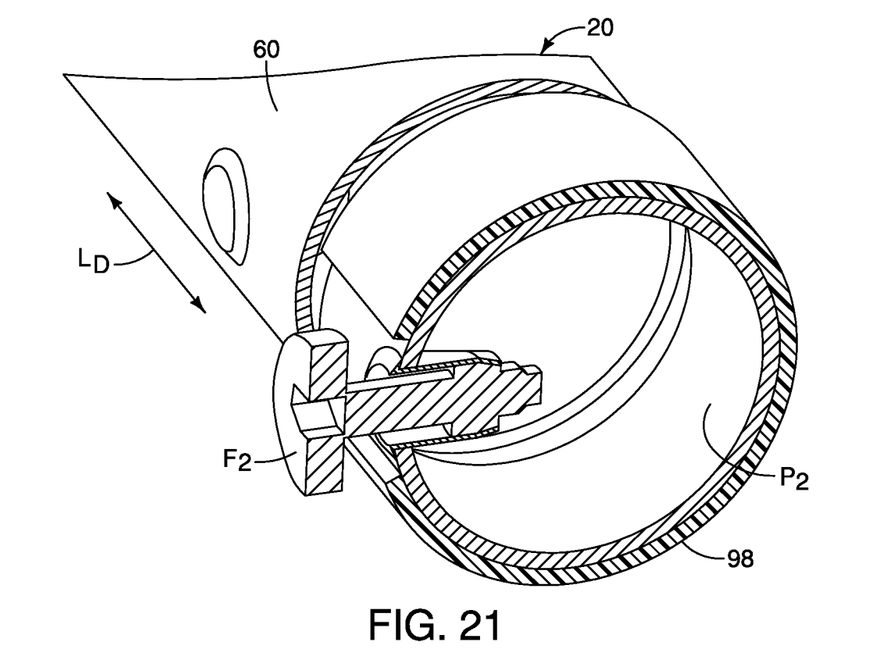
FIG. 21 is a cross-sectional view with one cut taken along the line 21-21 in FIG. 15, with portions a fastener structure removed to show a fastener that extends through a portion of the fastening structure and through an opening in one of the pipes retaining the pipe to the tube connector in accordance with the first embodiment.

The first and second projections 90 and 92 extend from the wall 80 through the first hollow area 62 to a location proximate the first opening 68 with the first and second elongated projections 90 and 92 defining an X-shape as viewed through the first opening 68.

Figure 18:
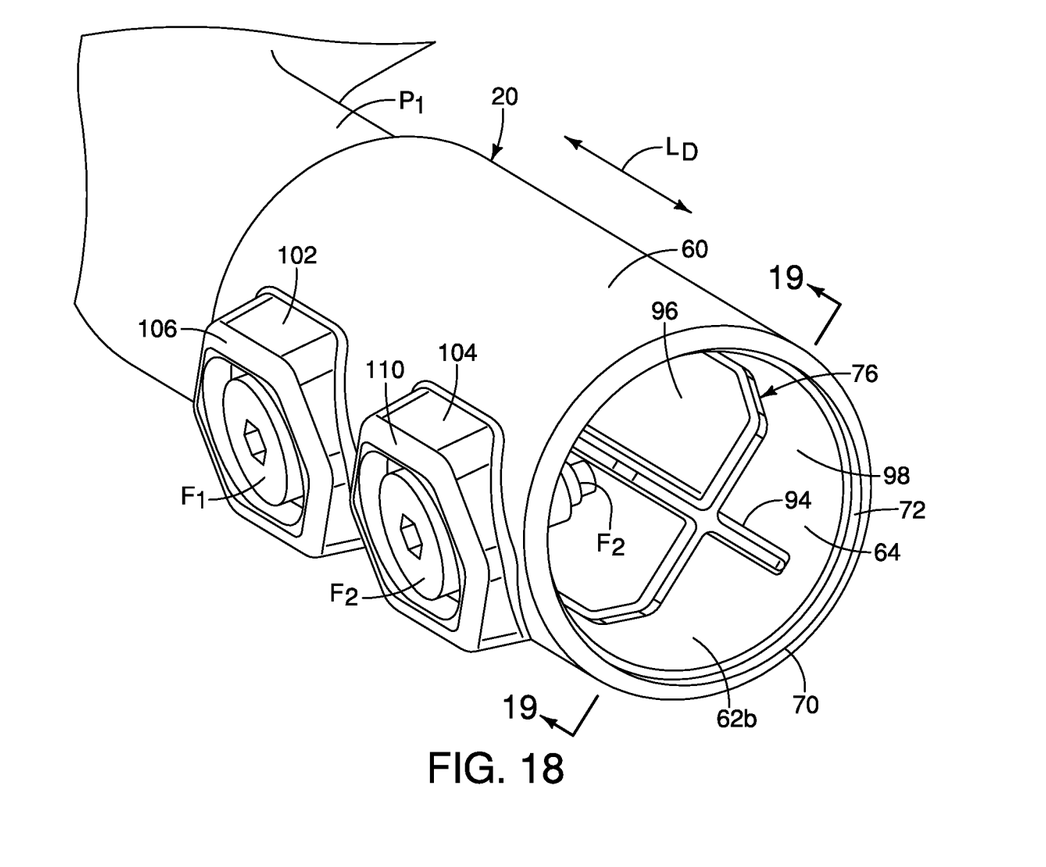
FIG. 18 is another perspective view of the tube connector showing the second pipe aligning structure within the hollow interior of the tube connector and visible through an opening at the second end of the tube connector in accordance with the first embodiment.

Within the second hollow space 62b, the pipe aligning structure 76 also includes a third elongated projection 94 and a fourth elongated projection 96 that extends outward from the wall 80. More specifically, the third and fourth projections 94 and 96 extend from the wall 80 through the first hollow area 62 to a location proximate the second opening 72 with the third and fourth elongated projections 94 and 96 defining an X-shape as viewed through the second opening 72.

The first and second elongated projections 90 and 92 are dimensioned such that the first pipe $P_1$ can easily slip around the first and second elongated projections 90 and 92. In other words, the width of each of the first and second elongated projections 90 and 92 is slightly smaller than an inner diameter of the first pipe $P_1$.

Similarly, the third and fourth elongated projections 94 and 96 are dimensioned such that the second pipe $P_2$ can easily slip around the third and fourth elongated projections 94 and 96. In other words, the width of each of the third and fourth elongated projections 94 and 96 is slightly smaller than an inner diameter of the second pipe $P_2$.

As shown in FIGS. 18 19, 21 and 22, a portion of the cylindrical inner surface 64 is lined with a compressible and resilient elastic material 98 that serves as cushioning for the first pipe $P_1$ and the second pipe $P_2$ once installed within the hollow interior 62 of the cylindrically shaped body 60. Once centered within the first and second hollow spaces 62a and 62b, the first pipe $P_1$ and the second pipe $P_2$ are cushioned by the material 98 within the cylindrically shaped body 60, as is described further below.

The cylindrical inner surface 64 has an inner diameter $D_1$ that is greater than the outer diameter $D_2$ of the first and second pipe $P_1$ and $P_2$. The difference between these diameters defines a gap between the outer surface of each of the first and second pipe $P_1$ and $P_2$ and the cylindrical inner surface 64 of the cylindrically shaped body 60. This gap provides space for the elastic material 98. The elastic material 98 provides a cushioning effect between the first and second pipe $P_1$ and $P_2$ and the cylindrical inner surface 64 of the cylindrically shaped body 60. In other words, the elastic material 98 eliminates noises that might occur by contact between the first and second pipe $P_1$ and $P_2$ and the cylindrical inner surface 64 of the cylindrically shaped body 60 and eliminates vibrations that might occur between the first and second pipe $P_1$ and $P_2$ and the cylindrical inner surface 64 of the cylindrically shaped body 60. The elastic material 98 also provides a means for slight mis-alignments between respective ones of the first and second pipe $P_1$ and $P_2$ and the cylindrical inner surface 64 of the cylindrically shaped body 60.

As shown in FIGS. 15-18 and 20-22, the cylindrically shaped body 60 includes a first fastening structure 102 that retains the first hollow pipe $P_1$ within the first hollow space 62a of the cylindrically shaped body 60. The cylindrically shaped body 60 also includes a second fastening structure 104 that retains the second hollow pipe $P_2$ within a second hollow space 62b of the cylindrically shaped body 60. The first fastening structure 102 defines projection 106. In the depicted embodiment, the projection 106 has a hexagonal shape. A central area of the projection 106 has an opening or elongated slot 108 that extends to and is open to the first hollow space 62a of the hollow interior 62 of the cylindrically shaped body 60. The elongated slot 108 is longer in the lengthwise direction $L_D$ of the cylindrically shaped body 60 than in a direction perpendicular to the lengthwise direction $L_D$.

The second fastening structure 104 defines another projection 110. In the depicted embodiment, the projection 110 has a hexagonal shape. A central area of the projection 110 has circular opening 112 that extends to and is open to the second hollow space 62b of the hollow interior 62 of the cylindrically shaped body 60. Put another way, the first fastening structure 102 is on a first side of the wall 80 and the second fastening structure 104 is on an opposite side of the wall 80.

Fasteners $F_1$ and $F_2$ are inserted into the elongated slot 108 and the opening 112, respectively, for engagement with respective ones of the first pipe $P_1$ and the second pipe $P_2$. Preferably, the respective portions of the first pipe $P_1$ and the second pipe $P_2$ that are inserted into the cylindrically shaped body 60 include corresponding threaded openings that receive respective ones of the fasteners $F_1$ and $F_2$ (FIGS. 15, 18 and 21) thereby retaining the first pipe $P_1$ and the second pipe $P_2$ to and within the cylindrically shaped body 60.

The cylindrically shaped body 60 can be made of any of a variety of materials, such as, steel, an iron alloy, aluminum or an aluminum alloy. However preferably, the cylindrically shaped body 60 is made of a plastic/nylon material, such as polyamide 6.

Second Embodiment

Figure 23:
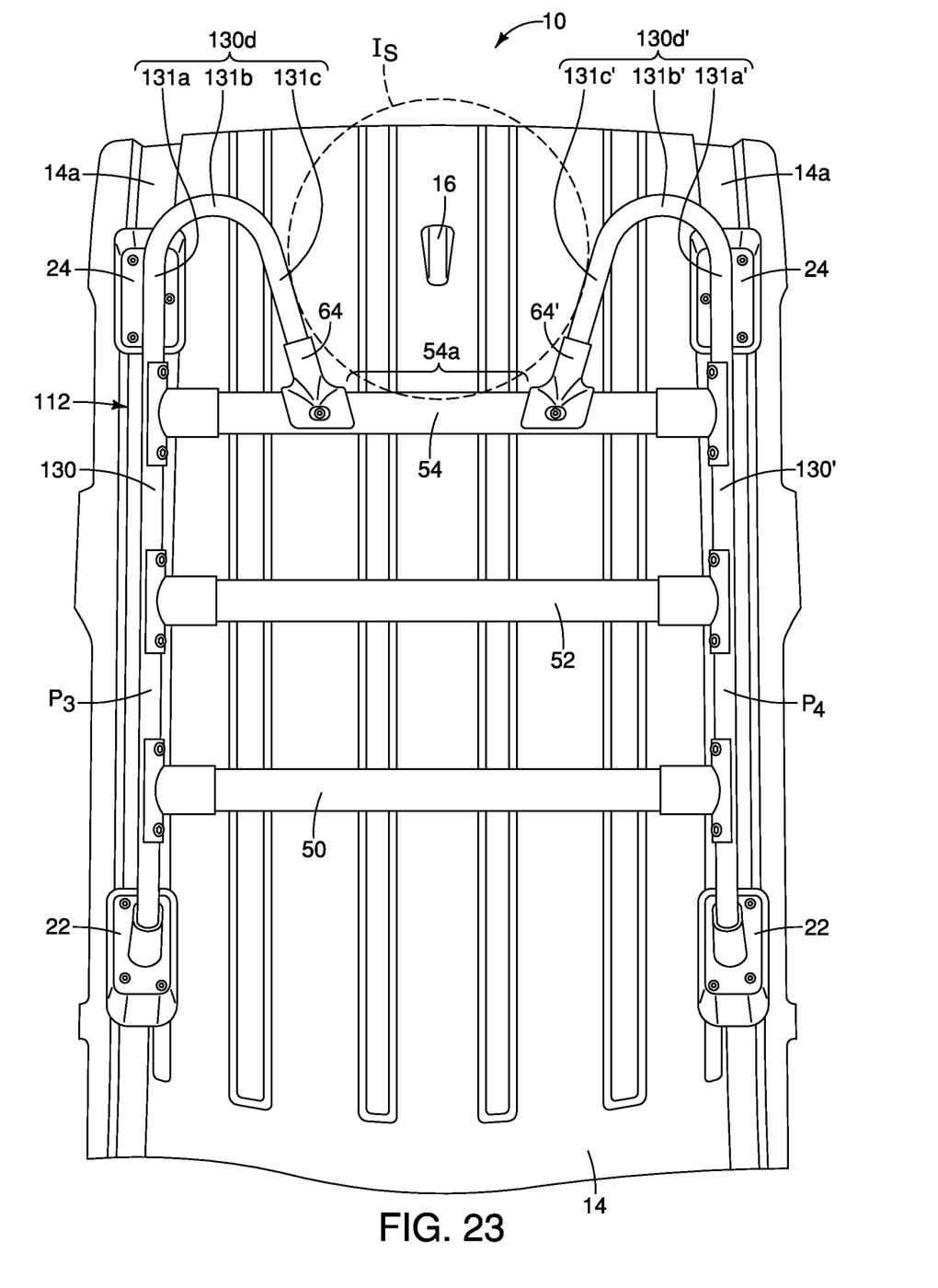
FIG. 23 is a top view of the vehicle roof and antenna with a roof rack assembly installed to the vehicle roof in accordance with a second embodiment.

Referring now to FIG. 23, a roof rack assembly 112 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The roof rack assembly 112 includes a first pipe $P_3$, a second pipe $P_4$, the forward attachment assemblies 22, the rear attachment assemblies 24, the cross member 50, the cross member 52 and a cross-member 54.

The forward attachment assemblies 22, the rear attachment assemblies 24, the cross member 50 and the cross member 52 are described above with reference to the roof rack assembly 12 of the first embodiment. In the second embodiment, the first pipe $P_3$, the second pipe $P_4$ and a cross member 54 are modifications as compared to the roof rack assembly 12 of the first embodiment. Hence, the description below focuses on the first pipe $P_3$, the second pipe $P_4$ and the cross member 54.

The first pipe $P_3$ has a main section 130 with a front end 130a, a forward portion 130b and a mid-portion 130c. The first pipe $P_1$ further includes a rearward portion 130d that extends rearward from the mid-portion 130c. The rearward portion 130d includes a first section 131a, a second section 131b and a third section 131c. The first section 131a is directly attached to or extends from the mid-portion 130c. Further, the first section 131a extends rearward along the lateral side 18 of the roof structure 14 then curves in the inboard direction $I_D$ and defines the second section 131b. The second section 131b then curves in order to extend in the forward direction $F_D$ inboard of the first section 131a and outboard of the antenna 16.

The second pipe $P_4$ has a main section 130' with a front end 130a', a forward portion 130b' and a mid-portion 130c'. The second pipe $P_2$ further includes a rearward portion 130d' that extends rearward from the mid-portion 130c'. The rearward portion 130d' includes a first section 131a', a second section 131b' and a third section 131c'. The first section 131a' is directly attached to or extends from the mid-portion 130c'. Further, the first section 131a' extends rearward along the lateral side 18 of the roof structure 14 then curves in the inboard direction $I_D$ and defines the second section 131b'. The second section 131b' then curves in order to extend in the forward direction $F_D$ inboard of the first section 131a' and outboard of the antenna 16.

The first pipe $P_3$ and the second pipe $P_4$ can be made of a variety of materials. For example, the first pipe $P_3$ can be made of a metallic material such as steel, aluminum or aluminum alloy, in which case the main section 130 and the rearward portion 130d can be bent to form the depicted shape.

Preferably, the first pipe $P_3$ and the second pipe $P_4$ can also be made of, for example, a fiberglass/resin material or other composite materials, plastic, polymer materials, or nylon and polymer materials such as, for example, Nylon 6 or polycaprolactam.

The opposite ends of the cross member 54 are attached to respective ones of the first pipe $P_3$ and the second pipe $P_4$.

The third section 131c and the third section 131c' extend in the forward direction $F_D$ toward the cross member 54. A forward end of the third section 131c is connected to the cross member 54 via a first bracket 64. Similarly, a forward end of the third section 131c' is connected to the cross member 54 via a second bracket 64'.

The third section 131c and the third section 131c' are spaced apart from one another, as are the first bracket 64 and the second bracket 64'.

As shown in FIG. 23, the first pipe $P_3$ and the second pipe $P_4$ basically have the same overall shape and otherwise identical to one another except that they are mirror images of one another.

The third section 131c, a central area of the cross member 54 and the third section 131c' are shaped and dimensioned to be spaced apart from the antenna 16 by a predetermined distance (via the first and second brackets 64 and 64'). The third section 131c and the third section 131c' are not parallel to the lateral sides 18 of the roof structure 14 and basically converge toward one another in the forward direction $F_D$. As shown in FIG. 23, the third section 131c, a central area of the cross member 54 and the third section 131c' at least partially surround the antenna 16 being spaced apart from the antenna 16 outside or along the interference perimeter $I_S$.

Hence, the overall shape and dimensions of the first pipe $P_3$ and the second pipe $P_2$ are designed to limit and/or eliminate the possibility of interfering with the reception capabilities of the antenna 16 by being spaced apart from the antenna 16 such that the roof rack assembly 12 is located outside or adjacent to the interference perimeter $I_S$.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the roof rack assembly. Accordingly, these terms, as utilized to describe the present invention should be interpreted relative to a vehicle equipped with the roof rack assembly.

The term "configured" as used herein to describe a component, section or part of a structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle roof rack assembly, comprising:
    a vehicle roof having an antenna installed thereon, the antenna defining an interference perimeter around itself that is a predetermined distance from the antenna, the interference perimeter surrounds an interference space around the antenna such that the antenna operates optimally in the absence of structures within the interference space;
    a first pipe installed to the vehicle roof having a main portion and a rearward portion, the main portion thereof extending along a first lateral side of the vehicle roof, the rearward portion having a first section, a second section and a third section, the first section extending rearward from the main portion and rearward of the antenna, the second section extending in an inboard direction rearward of the antenna, a third section extending in a forward direction from the second portion inboard of the first section and outboard of the antenna along and outside of the interference perimeter such that the third section is spaced apart from the antenna by at least the predetermined distance; and
    a second pipe installed to the vehicle roof having a main portion and a rearward portion, the main portion thereof extending along a second lateral side of the vehicle roof opposite the first lateral side, the rearward portion having a first section, a second section and a third section, the first section extending rearward from the main portion and rearward of the antenna, the second section extending in an inboard direction rearward of the antenna, a third section extending in a forward direction from the second portion inboard of the first section and outboard of the antenna along and outside of the interference perimeter such that the third section is spaced apart from the antenna by at least the predetermined distance.

2. The vehicle roof rack assembly according to claim 1, wherein
    the rearward portion of the first pipe includes a fourth section that extends in an inboard direction from the third section forward of the antenna along and outside of the interference perimeter, and
    the rearward portion of the second pipe includes a fourth section that extends in an inboard direction from the third section forward of the antenna along and outside of the interference perimeter and further extends toward the fourth section of the rearward portion of the first pipe.

3. The vehicle roof rack assembly according to claim 2, wherein
    the fourth section of the rearward portion of the first pipe and the fourth section of the rearward portion of the second pipe are connected to one another via a tube connector.

4. The vehicle roof rack assembly according to claim 3, wherein
    the tube connector has an at least partially hollow interior dimensioned such that a first end of the tube connector receives and retains the fourth section of the rearward portion of the first pipe and a second end of the tube connector receives and retains the fourth section of the rearward portion of the second pipe.

5. The vehicle roof rack assembly according to claim 3, wherein
    the fourth section of the rearward portion of the first pipe, the fourth section of the rearward portion of the second pipe and the tube connector are aligned with one another.

6. The vehicle roof rack assembly according to claim 5, wherein
    the third section of the rearward portion of the first pipe, the fourth section of the rearward portion of the first pipe, the fourth section of the rearward portion of the second pipe and the third section of the rearward portion of the second pipe define an overall U-shape that at least partially surrounds a forward half of the interference space of the antenna.

7. The vehicle roof rack assembly according to claim 1, further comprising
    a cross member attached to the main section of the first pipe adjacent to the first section of the rearward portion of the first pipe and attached to the main section of the second pipe adjacent to the first section of the rearward portion of the second pipe.

8. The vehicle roof rack assembly according to claim 7, wherein
    the third section of the rearward portion of the first pipe is attached to the cross member at a location spaced apart from the main section of the first pipe and the third section of the rearward portion of the second pipe is attached to the cross member at a location spaced apart from the main section of the second pipe.

9. The vehicle roof rack assembly according to claim 8, wherein
    a central section of the cross member is located adjacent to the interference perimeter and the interference space.

10. The vehicle roof rack assembly according to claim 7, wherein
    a central section of the cross member is located adjacent to the interference perimeter and the interference space.

11. The vehicle roof rack assembly according to claim 10, wherein
    the third section of the rearward portion of the first pipe, the central section of the cross member and the third section of the rearward portion of the second pipe define an overall U-shape that at least partially surrounds the interference space of the antenna.

* * * * *